United States Patent Office.

GERONIMO RIVERA, OF CAMBRIDGEPORT, MASSACHUSETTS.

Letters Patent No. 74,429, dated February 11, 1868.

IMPROVED PINE-APPLE BEER.

The Schedule referred to in these Letters Patent and making part of the same.

TO ALL WHOM IT MAY CONCERN:

Be it known that I, GERONIMO RIVERA, of Cambridgeport, in the county of Middlesex, and State of Massachusetts, have invented a new beverage, which I term Pine-Apple Beer; and I do hereby declare that the following is a full, clear, and exact description of the method of preparing and compounding the same.

The object of my invention is to produce a harmless, healthful, and palatable beverage, suitable for the use of invalids as well as those in health; and the invention consists in preparing such beverage from the pine-apple in the manner hereinafter described.

The pine-apple is first ground or mashed to a pulp, and then placed in a vessel containing cold water, in about the proportion of a pound and a half of the pine-apple to three gallons of water. The pine-apple will sink to the bottom of the water, and there remain until all the juice or succulent matter will have been absorbed by the water. The pine-apple or pulp will then rise to the surface, when a slight fermentation takes place. The pulp is then removed from the water, and to the latter are then added about three pounds of sugar, or as much as will give it the proper degree of sweetness and flavor. The liquid is then strained, and immediately poured into bottles and tightly corked. The beverage will be fit for use in the course of about twenty-four hours, and may be kept fit for use, without becoming acid or losing its efficacy, for a considerable length of time, say two or three months. When it is desirable to keep it for a longer time, the liquid, after being prepared as above described, is impregnated with brandy, which is effected by first soaking sheets of blotting-paper in pure brandy, and then placing them in the liquid, when the brandy will be absorbed by the latter, thus imparting a fine, spirited flavor to the beverage, and enabling it to be kept for any reasonable period.

A beverage thus produced will be found to be very refreshing to the invalid, as well as to those in health. It is found, by experience, to be very efficacious in costiveness, and imparts a healthy action to the bowels. It is perfectly simple and innocuous, possessing none of the deleterious qualities often found in the so-called prepared "mineral-waters."

Having thus described my invention, what I claim as new, and desire to secure by Letters Patent, is—

The beverage, made and prepared essentially as above described, and which I term Pine-Apple Beer.

In testimony whereof, I have signed my name to this specification in the presence of two subscribing witnesses.

G. RIVERA.

Witnesses:
J. H. ADAMS,
C. M. BOND.